(12) United States Patent
Douglas

(10) Patent No.: US 6,175,691 B1
(45) Date of Patent: Jan. 16, 2001

(54) MULTIPLE MODE IMAGING SYSTEM

(75) Inventor: Lawrence M. Douglas, South Easton, MA (US)

(73) Assignee: Polaroid Corporation, Cambridge, MA (US)

( * ) Notice: Under 35 U.S.C. 154(b), the term of this patent shall be extended for 0 days.

(21) Appl. No.: 09/248,604

(22) Filed: Feb. 11, 1999

Related U.S. Application Data

(60) Provisional application No. 60/074,527, filed on Feb. 12, 1998.

(51) Int. Cl.⁷ .......................... G03B 17/48; G03B 17/50; G03B 17/04
(52) U.S. Cl. ..................... 396/30; 396/348; 396/429
(58) Field of Search .................. 396/350, 348, 396/424, 420, 30, 429

(56) References Cited

U.S. PATENT DOCUMENTS

| | | | |
|---|---|---|---|
| 3,810,211 | 5/1974 | Wareham et al. | 396/34 |
| 3,832,726 | 8/1974 | Finelli | 396/350 |
| 4,226,519 | 10/1980 | Gervais et al. | 396/366 |
| 4,387,978 | 6/1983 | Pizzuti | 396/350 |
| 4,508,440 | 4/1985 | Costa et al. | 396/350 |
| 4,949,117 * | 8/1990 | Van Heyningen et al. | 396/354 |
| 5,027,142 | 6/1991 | Douglas | 396/33 |
| 5,150,215 * | 9/1992 | Shi | 396/429 |
| 5,151,728 | 9/1992 | Hendry et al. | 396/350 |
| 5,687,411 | 11/1997 | Minoru et al. | 396/310 |
| 5,790,907 * | 8/1998 | Reibl | 396/348 |
| 5,950,020 * | 9/1999 | Ball et al. | 396/348 |

\* cited by examiner

Primary Examiner—D. Rutledge
(74) Attorney, Agent, or Firm—Leslie Payne

(57) ABSTRACT

A foldable multiple mode imaging acquisition apparatus, such as a camera, having a first and second housing assembly; an erecting assembly interconnected to and between the first and second housing assemblies for allowing movement of the housing assemblies between a folded first condition and an unfolded second condition; a pair of hand gripping sections to allow a user to easily and in a stable manner grip the apparatus in both the first and second conditions without having to remove hands from the first housing assembly and while the assemblies transition between the first and second conditions; a viewfinder assembly mounted adjacent a distal end portion of the second assembly and oriented such that an operator can hold the apparatus in a generally vertical mode when the housing assemblies are in the first folded condition and view the scene, and in a generally horizontal mode when the housing assemblies are in the second unfolded condition and view the same scene.

9 Claims, 10 Drawing Sheets

MULTIPLE MODE IMAGING SYSTEM

This application claims the benefit of U.S. Provisional Patent Application No. 60/074,527 filed Feb. 12, 1998.

BACKGROUND OF THE INVENTION

The present invention generally relates to a folding imaging apparatus and, in particular, a foldable image acquisition apparatus having multiple modes of operation and, preferably employing self-developing film.

A variety of foldable photographic apparatus, especially of the self-developing type are known. Typically, such apparatus have a plurality of interconnected housing members mounted for movement between a folded inoperative position, and an unfolded or erect operative position. Examples of such cameras are represented by U.S. Pat. Nos.: 3,810,211 issued to Wareham et al; 4,387,978 issued to Pizzuti; 3,832,726 issued to Finelli; 5,027,142 issued to Douglas; 5,151,728 issued to Hendry et al.; and, 5,687,411 issued to Matsuzaki et al.

However, it is an object of the present invention to provide a novel and improved foldable multiple mode imaging acquisition apparatus which is operative in either a folded or collapsed mode and an erect or unfolded mode.

SUMMARY OF THE INVENTION

According to the present invention provision is made for a foldable multiple mode imaging acquisition apparatus. The apparatus comprises, in combination: a first housing assembly; a second housing assembly; an erecting assembly operatively interconnected to and between the first and second housing assemblies for allowing movement of the housing assemblies between a folded first condition and a second unfolded condition. Included is a viewfinder assembly mounted adjacent a distal end portion of the second assembly; and, a pair of spaced apart and generally longitudinally extending hand gripping sections on the first housing assembly. The viewfinder assembly is oriented in such a fashion that an operator can hold the apparatus in a generally vertical mode when the housing assemblies are in the first condition, and in a generally horizontal mode when the housing assemblies are in the second condition. The hand gripping sections are sized and constructed to allow a user to easily and in a stable manner grip the apparatus in both the first and second conditions without having to remove hands from the first housing assembly.

In an illustrated embodiment, provision is made for g a viewfinder assembly being mounted adjacent a distal end portion of the second assembly. The viewfinder assembly is oriented in such a fashion that an operator can hold the apparatus in a generally vertical mode when the housing assemblies are in the first condition, and in a generally horizontal mode when the housing assemblies are in the second condition.

In another illustrated embodiment provision is made for a first housing assembly which houses photographic film of the self-developing type; and, wherein the second housing assembly comprises an electronic image acquisition apparatus thereon.

In another illustrated embodiment, provision is made for a strobe assembly being mounted adjacent a distal end portion of the second assembly so that the strobe can illuminate a scene to be imaged when the housing assemblies are in either of the first or second conditions.

In another illustrated embodiment, provision is made for a viewfinder assembly being constructed and oriented with respect to the second housing assembly so that when the apparatus is held in the vertical mode the second housing assembly does not obstruct an operators face.

In an illustrated embodiment, provision is made for an electronic camera comprising, in combination: a housing means for defining a recess; a cover assembly connected to the housing assembly for folding movement between covering and uncovering positions with respect to the recess; an LCD assembly connected to the cover assembly in such a manner that it is within and faces the recess when the cover assembly is in the covering position; and, means within the recess for detachably coupling a flash memory card which is constructed to be received therein.

It is an object of the present invention to provide an arrangement that allows the user to easily and in a stable manner grip the apparatus in both operative modes without having to remove his/her hands from the apparatus; thereby facilitating reliable and ergonomic use in either folded or unfolded modes.

It is a still further object of the invention to provide a multiple mode image acquisition apparatus which in the collapsed condition operates in an electronic image acquisition mode, and in the erect condition operates in a photographic image acquisition and/or an electronic image acquisition mode.

It is a further object of the present invention to provide a multiple mode image acquisition apparatus which is ergonomically operable in the different operative modes as well as when transitioning between the modes.

It is a still further object of the present invention to use common photographic features, such as the viewfinder, strobe, and shutter button without having to physically orient anyone of the features regardless of which of the acquisition modes is operative.

It is a further object of the present invention to provide for the effective utilization of a flash memory card in combination with an LCD display apparatus, wherein the LCD display can be moved from a folded position to a plurality of positions; wherein a user is allowed to insert and remove the card from a cavity in the digital camera which was, in part, occupied by the LCD display.

It is a still further object of the present invention to multiple mode image acquisition apparatus which is highly compact in the folded position, corresponding to the electronic imaging mode, and yet may be easily and smoothly erected into the photographic mode without requiring the user to remove his hands from the imaging apparatus.

Further still it is an object of the invention to provide such an apparatus which utilizes self-developing film units.

BRIEF DESCRIPTION OF THE DRAWINGS

Other objects and features of the present invention will become apparent from the following more detailed description taken in conjunction with the attached drawings in which.

DETAILED DESCRIPTION

Figure 1:
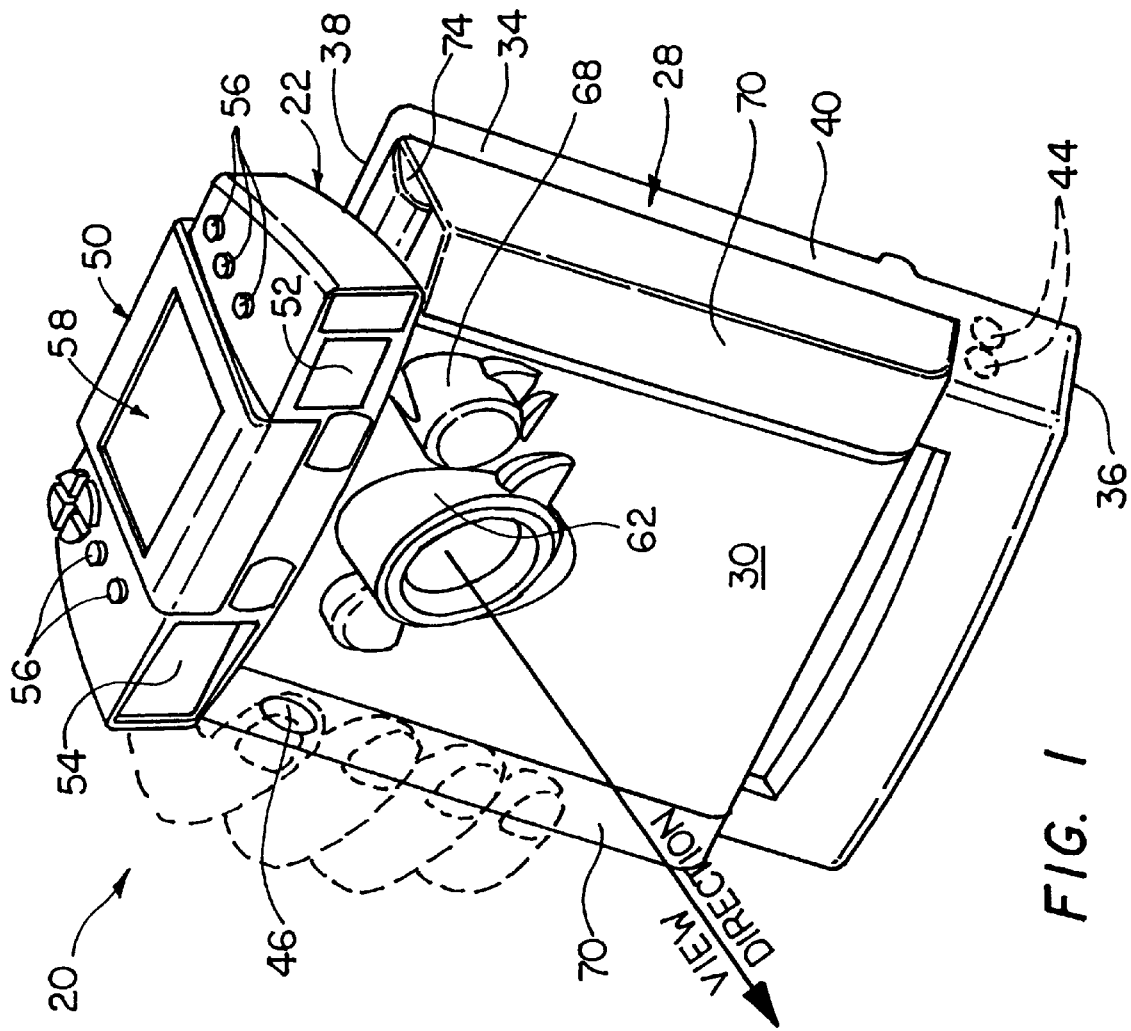
FIG. 1 illustrates a multiple mode image acquisition apparatus being shown in the collapsed condition.
Figure 2:
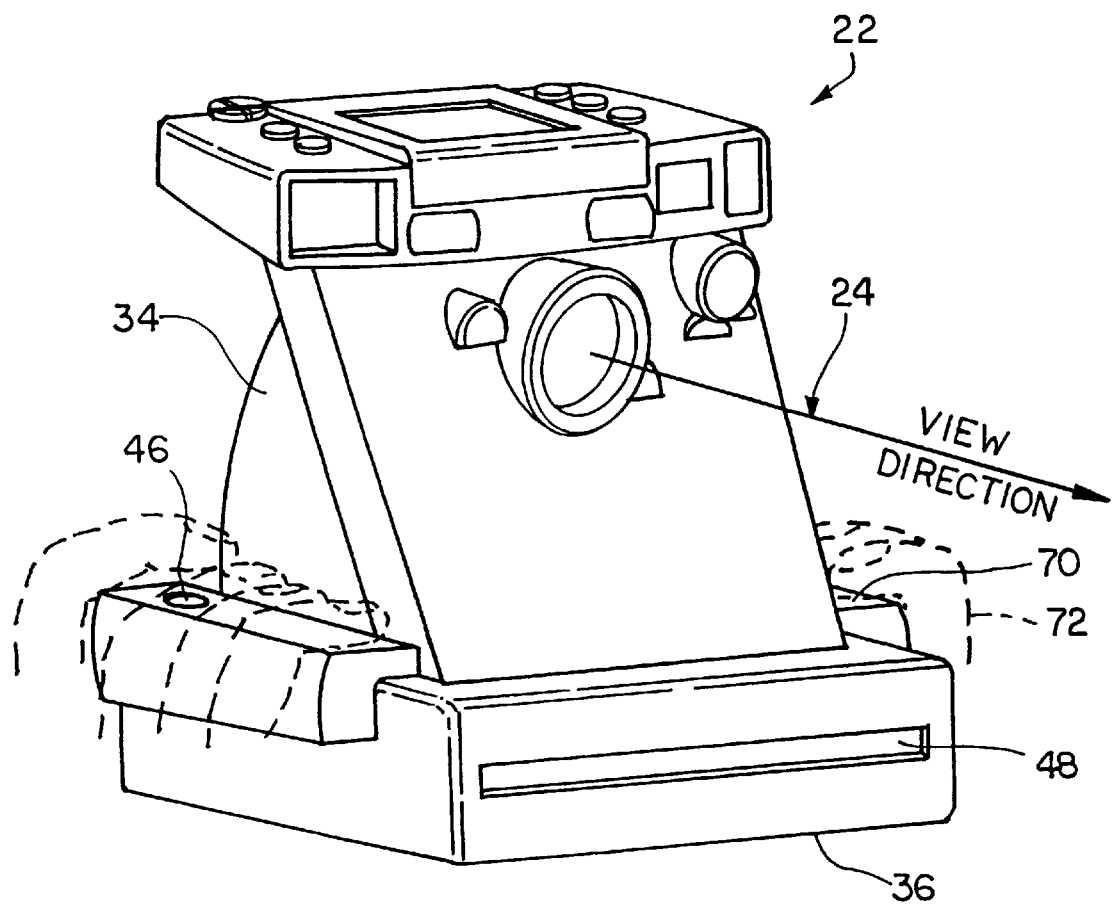
FIG. 2 illustrates the apparatus of FIG. 1 shown in the erect condition.

Referring now to the drawings in detail there is illustrated in FIGS. 1–9 one preferred embodiment of the present invention. Essentially, the present invention is directed to a foldable multiple mode image acquisition system or apparatus 20. In particular, the multiple imaging apparatus 20 when in the collapsed or folded mode functions as an electronic digital still camera 22, and when in the erect or unfolded mode functions as a photographic camera 24 and/or an electronic imaging mode. The present invention prefers that the photographic mode be performed utilizing self-developing film units 26 of the type commercially available from Polaroid Corporation; Cambridge, Mass. As noted the folding multiple imaging apparatus 20 is an electronic still camera when in one mode and a photographic camera of the self-developing type or an electronic imaging apparatus when in the other mode. Since the present invention does not concern itself, per se, with the details of the imaging apparatus 20, when in either photographic or electronic still imaging modes, the following description will only describe those components of each which facilitate understanding of the present invention. However, if a more detailed description of the self-developing camera is desired, reference is made to U.S. Pat. No. 4,508,440 issued to Costa et al. It will be further appreciated that the present invention envisions use of a variety of photographic and electronic imaging devices and is not to be limited by the present disclosure.

The multiple imaging apparatus 20 includes two major housing components 28, 30 that, through a linkage system 32, are movable between the noted folded and unfolded conditions. When in the photographic camera mode, the camera is adapted to sequentially expose a stack of such film units housed within the cassette (not shown), such as the type described in U.S. Pat. No. 4,226,519. In this regard, the lower housing component 28 includes a base housing 34 having a parallelepiped construction including an internal chamber for receiving the noted film cassette. The base housing 34 can be made of suitable materials and includes opposite front and rear walls 36, 38: respectively, and opposite side walls 40 extending from a bottom wall 42. These film units are subject to a diffusion transfer process and development through use of a pair of juxtaposed spread rolls 44 mounted in a spread roller housing 45 which rollers may be driven by a motor in accordance with well-known techniques in the art and which need not be described. As is well known in the art, the film unit is adapted to be moved out of the film cassette, subsequent to exposure, and into the bite of the spread rollers at least one of which is being driven at this time. The spread rollers continue the advancement of the exposed film unit until the it exits the slot. After a film unit is exposed in a manner not forming part of the present invention, it is advanced by film advancing unit to the nip of the spread rollers and exits from a film exit slot 46 formed in the front wall.

Reference is made to the erectable or upper housing component 30 which moves from the folded to the erect or unfolded condition, as viewed in the drawings. The upper housing component 30 can be made of suitable materials, such as plastic or other materials. In the present embodiment, the housing component 30 has mounted thereon at a top end a housing assembly 50 which includes a viewfinder 52 common to both modes, a strobe 54 common to both modes, operator buttons 56, and an LCD display system 58 operable for viewing electronically acquired images. The erectable housing component 30 is pivoted at 60 to the lower housing component 28. The housing component 30 includes a taking lens system generally indicated by reference numeral 62 which directs the scene rays along an optical path to a mirror 64 which then redirects the scene light rays toward the camera's focal plane. The mirror 64 forms part of the photographic camera's optical system. Also mounted on the erectable housing member is a photometer window 66 for directing scene light to the exposure control circuit which is not shown, but which is of the type used with self-developing cameras of the type described in U.S. Pat. No. 4,508,440. The erectable housing component 30 includes an electronic imaging module 68 for essentially controlling exposure during the digital imaging acquisition mode. The electronic module 68 may be of the type disclosed in copending U.S. provisional patent application 60/055,663 filed Aug. 14, 1997. It will be appreciated that the erectable housing component 30 can use a variety of systems for effecting control of exposure control during the electronic image acquisition mode, since the type of electronic imaging system does not, per se, form part of the present invention.

As depicted, the flash unit and viewfinder are mounted at a distal end of the upper housing member 50 and have an angular orientation with respect to the upper housing component 30, as depicted, which facilitates a user being able to effectively take exposures in either the collapsed or erect modes. In the collapsed or folded mode, the viewfinder and strobe have orientations at an angle with respect to upper housing so that a user is able to place an eye on the viewfinder without having his/her nose or other portion of the user's face contact the body of the camera. This tends to facilitate an ergonomic use of the imaging apparatus in the folded mode.

Reference is made back to the lower housing component 28 which has attached to each side wall 40 an elongated manual gripping portions 70. The two gripping portions 70 allow the user's hands to hold the imaging apparatus 20 in a stable and vertical orientation when the latter is in the folded electronic imaging mode. The gripping portions define hollow compartments 72 for removable reception therein of batteries which supply the camera with power. In this regard, suitable doors 74 are provided at the longitudinal ends of the grip housings for allowing insertion and retention of the batteries. Due to the construction of the imaging apparatus as noted provision is made for a well-balanced and ergonomically constructed imaging apparatus. The lower housing includes a spring biased latch finger 75 which engages a slot in the upper housing component for holding the two housings in a compact condition. When it is desired to unfold the folded imaging apparatus, the user presses on a latch button (not shown), thereby freeing the two housing components for movement to their erect orientation.

As shown in FIGS. 2–6, the upper housing assembly is pivotally mounted to the lower housing assembly by the linkage assembly 32 including an upper erecting link 90 and a lower erecting link 92 pivotally coupled at 94 by a pin. Each of the erecting links in the erecting assembly includes plate-like configurations and extends transversely of the camera between its sides and has bellow members 96 attached at opposite ends to the lower housing component to provide a light-tight enclosure as is well known for allowing exposure of the photographic film to occur. A torsion spring 98 provides a spring force which biases the erecting assembly in the erect condition. A pair of side fins 100, one on each side, has one end pivoted to the lower housing along the same pivot as the erectable housing and pivotally with movement of the lower link. The stop fins 100 have at one end a stop 102 which engages the lower link 92 (FIG. 4) when the latter moves to its erect position, thereby limiting movement of latter and the linkage system as well. As a result, fingers of the users may not be readily damage the exposed bellows. The stop fins are formed of a substantially rigid opaque material which has one end inside the lower housing assembly and which is pivoted between the elevated position shown in FIG. 4 to the horizontal collapsed position (not shown).

Figure 3:
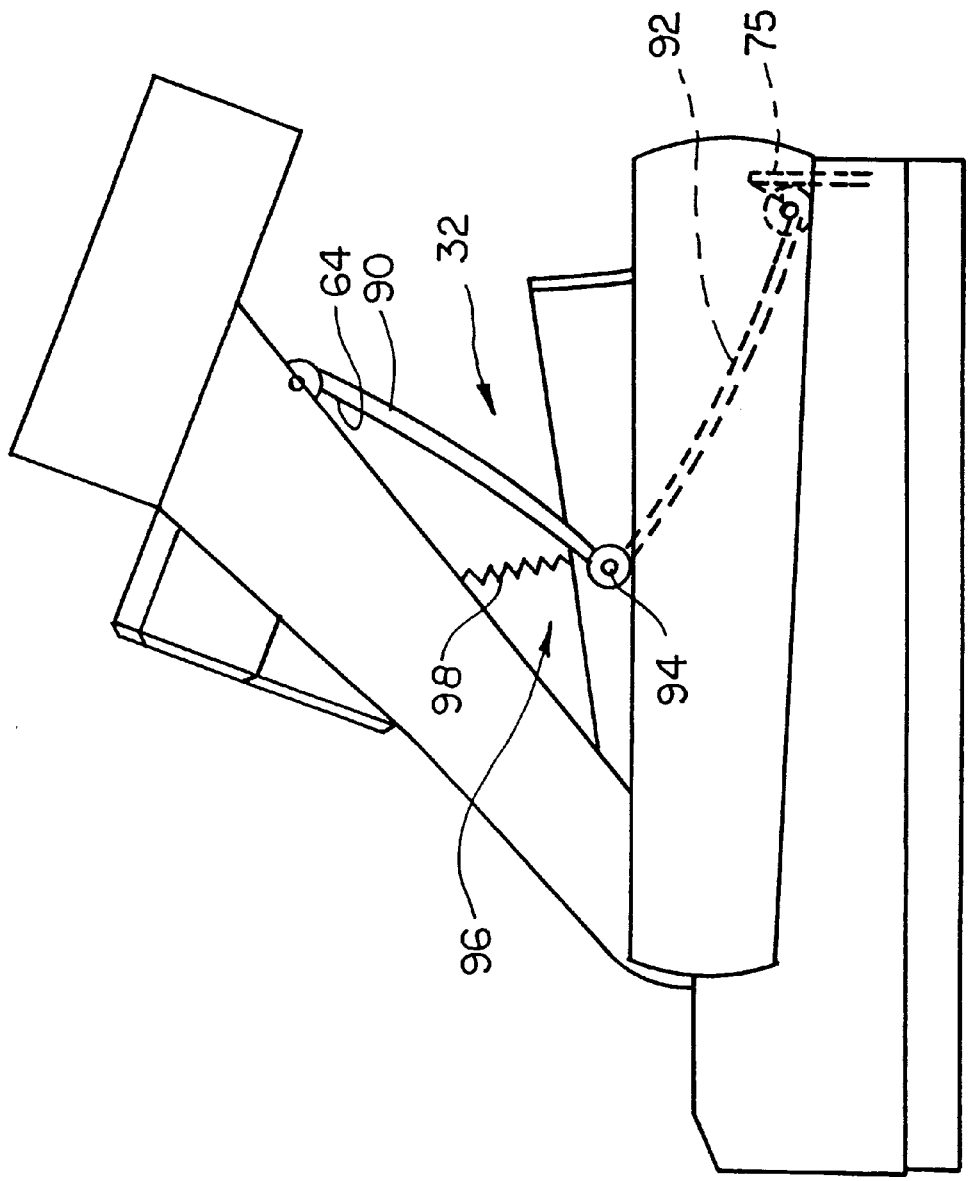
FIG. 3 is a side elevation view, partly in cross-section, showing the apparatus in a partially collapsed condition.
Figure 4:
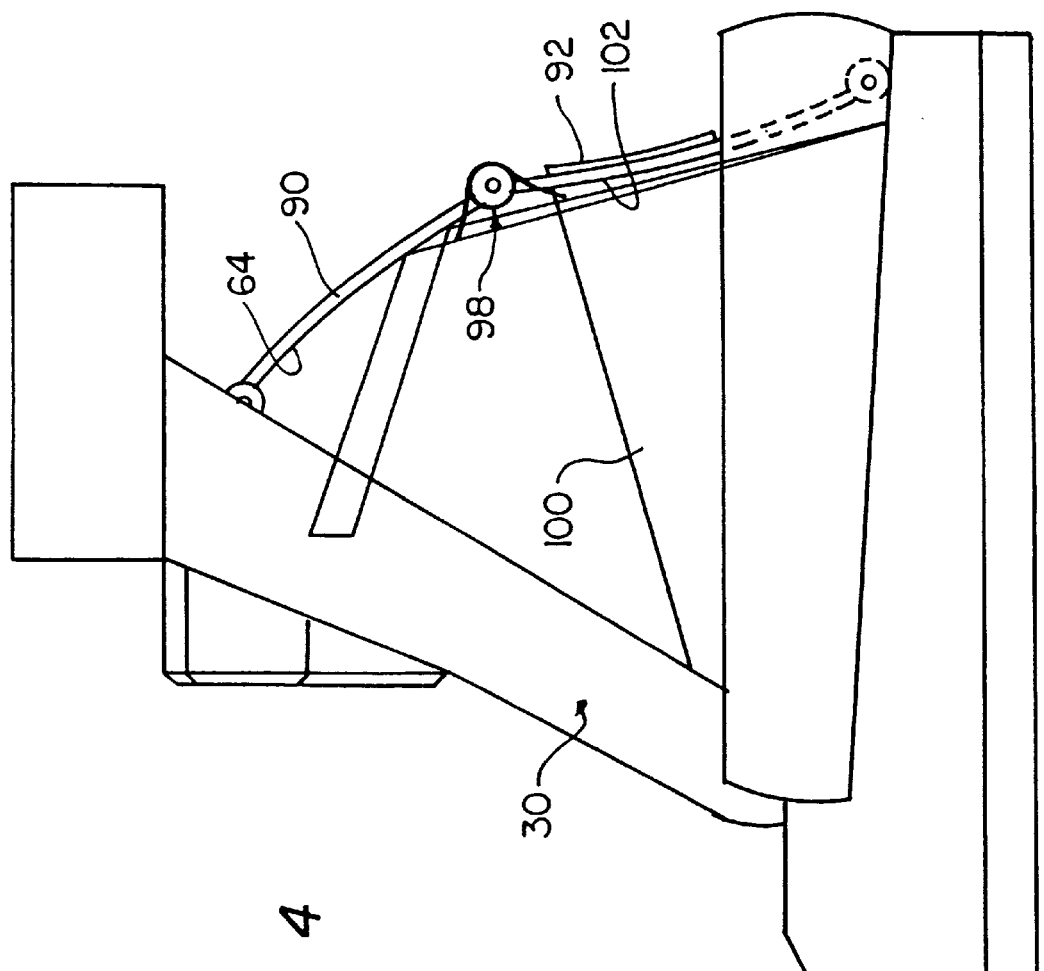
FIG. 4 is a view illustrating the image acquisition apparatus in a fully erect condition.
Figure 6:
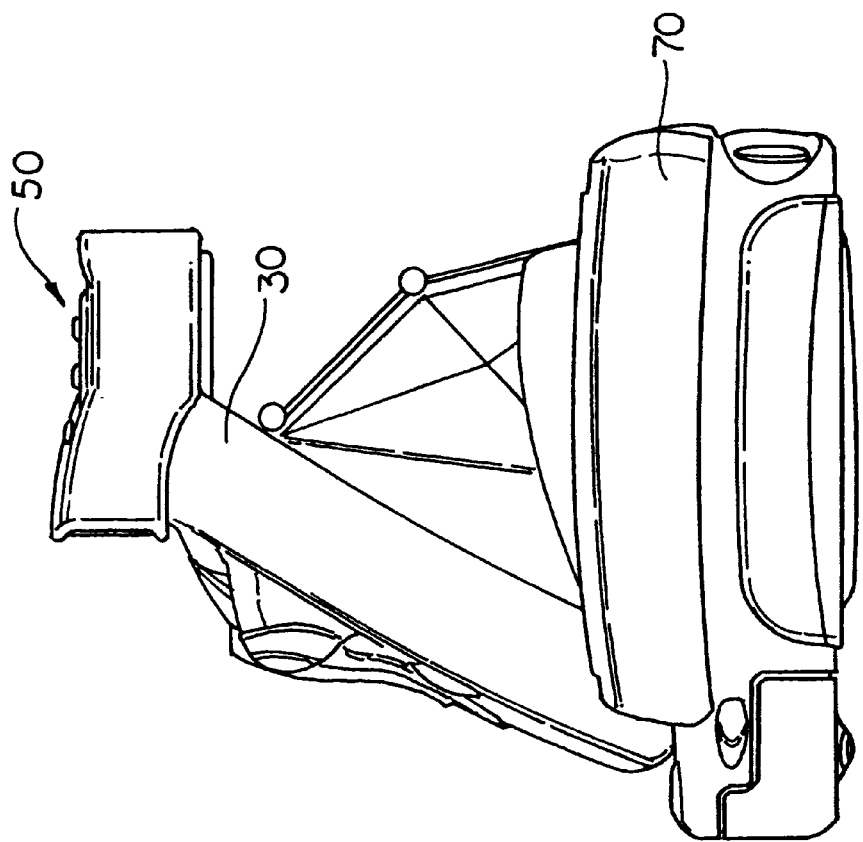
FIG. 6 is a left side view of the image acquisition apparatus.
Figure 5:
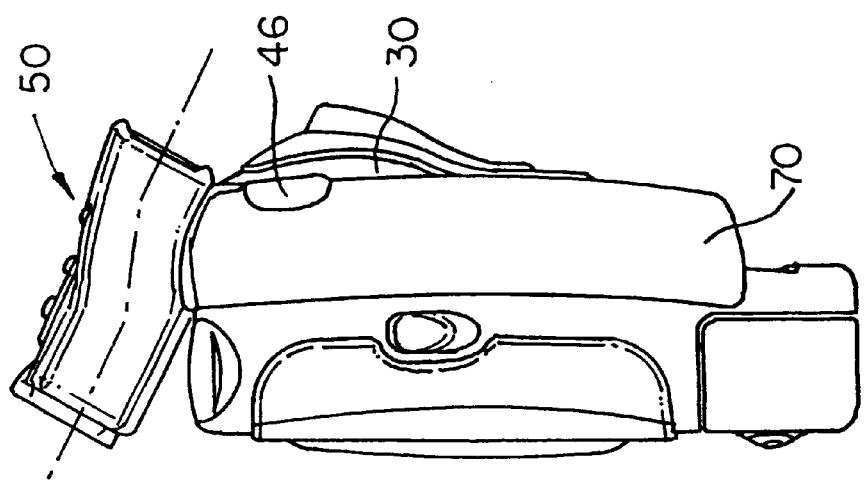
FIG. 5 is a right side view of the image acquisition apparatus.
Figure 7:
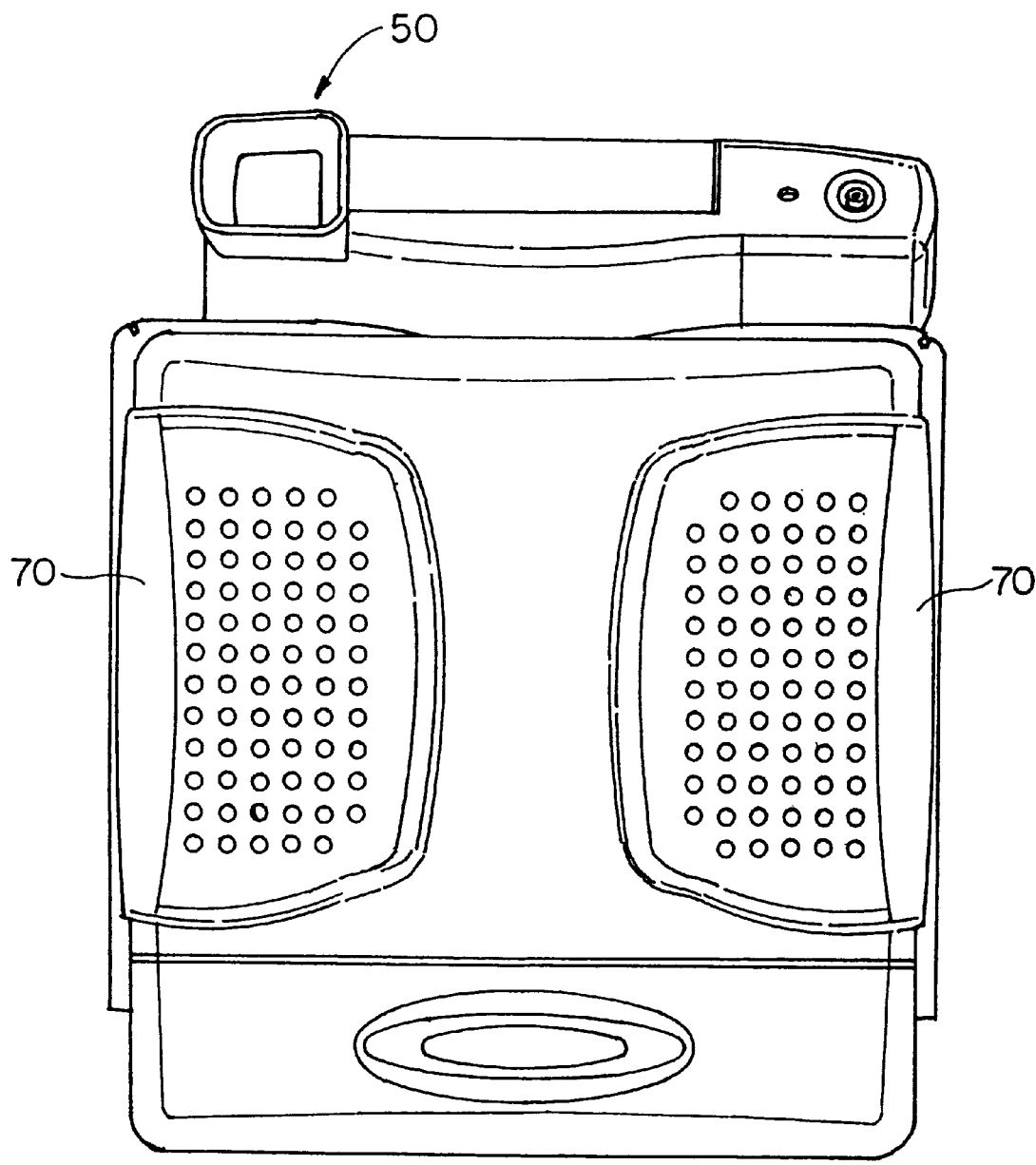
FIG. 7 is a back view of the image acquisition apparatus.
Figure 8:
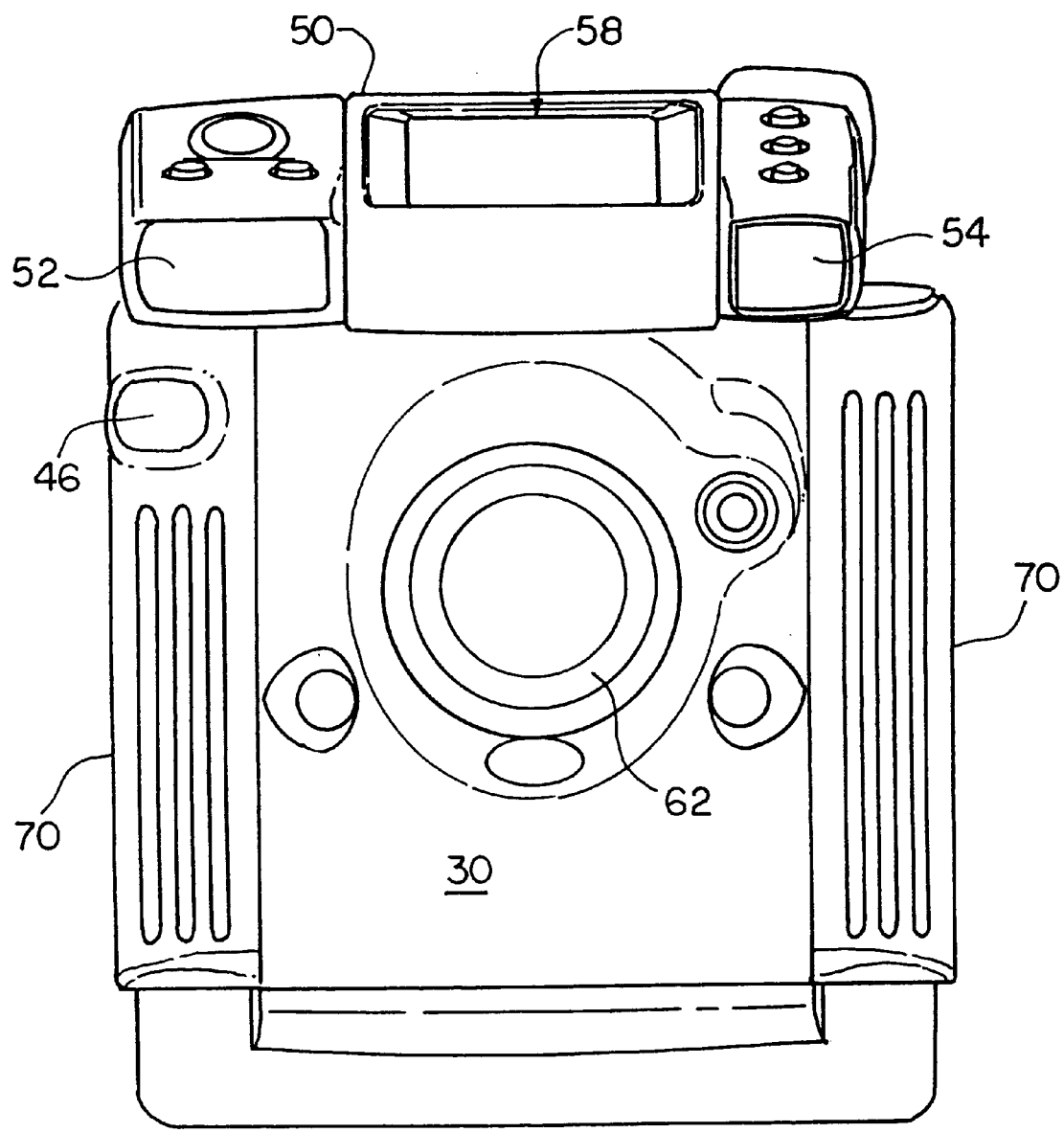
FIG. 8 is a front elevation view of the image acquisition apparatus in a collapsed condition.
Figure 9:
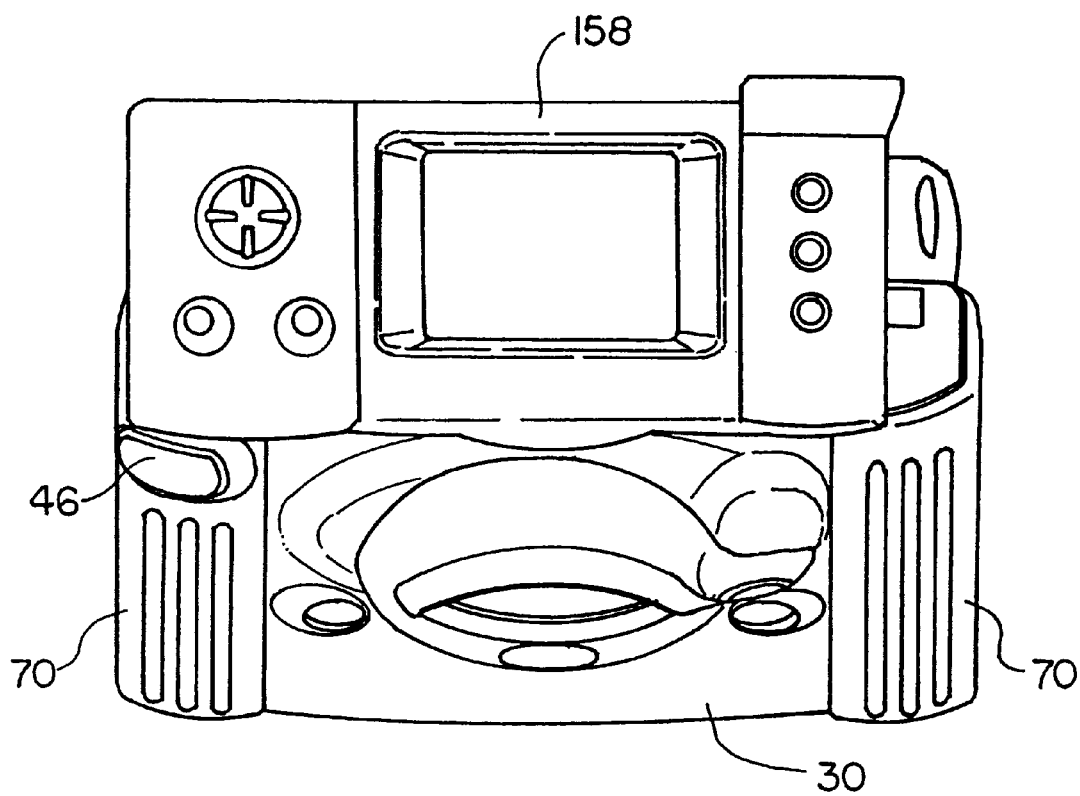
FIG. 9 is a top view of the image acquisition apparatus in a collapsed condition.

When it is desired to fold the photographic camera, the user presses inwardly on the upper link while simultaneously applying pressure with the other hand on the upper housing such as shown in FIG. 3 by the arrows. This results in the lower link rotating about the axis 94 defined by the pin and causing the upper housing to translate.

The present invention contemplates utilization of a single shutter button 46 which when the imaging apparatus in the collapsed condition is useful for commencing an exposure cycle for an image acquisition mode. The shutter button is also operable for actuating the photographic imaging apparatus for effecting a commencement of the exposure mode in the photographic image acquisition mode. In this regard, the imaging apparatus is provided with suitable circuitry for effecting such functioning. It will, however, be appreciated that the separate shutter button can be provided for each of the separate operative modes.

The imaging apparatus is ergonomically designed to facilitate convenient use by the user whether in the collapsed electronic image acquisition mode or the erect photographic and/or electronic image acquisition mode. By locating the shutter button on one of the grips adjacent the viewfinder, the user can conveniently grip the camera in a stable fashion to prevent shake and to facilitate proper aiming. By pressing the shutter button, an electronic image acquisition exposure interval would be commenced automatically. Should the user decide to then effect a photographic image so as to obtain a positive image thereof a latch button is depressed. The latch button will free automatic movement of the camera system from its collapsed condition to its erect condition. Although not shown, the invention contemplates that a user could pull upwardly on the upper housing and pivot it. The viewfinder which is common for both photographic and image acquisition modes will assume a raised elevation with respect to the lower housing. Despite the different orientation of the viewfinder and strobe, the user's hands can be maintained on the gripping portions. When the camera moves to the erect position, suitable circuitry (not shown) allows the shutter button to effect an exposure interval in the photographic image acquisition mode or an electronic image acquisition mode. Thus, the user can in the photographic mode depress the shutter button and effect a conventional image onto the self-developing film. Accordingly, the user can without removing the hands from the imaging apparatus move between a collapsed electronic imaging mode to an erect photographic imaging acquisition mode. As noted, a common shutter is used for effecting commencement of exposure for either the photographic and/or image acquisition modes.

Accordingly, the imaging apparatus has a combination of elements which are arranged and constructed as shown to facilitate an ergonomic use of the camera whether in the collapsed position or in the erect position. The gripping portions provide for a common or holding portion for the camera in either the erect or collapsed positions. This greatly simplifies and reduces any inconvenience a user might otherwise expect when a camera goes from a collapsed position to an erect position. The foregoing structure very simply carries out the foregoing objectives in a reliable manner.

Many of the aspects of the electronic imaging system as well as the photographic imaging system including exposure control is not believed necessary for the present embodiment to be described. The present invention is rather directed to a foldable imaging apparatus having gripping portions arranged for ergonomic use whether the apparatus is placed in collapsed or erect positions. Moreover, the present invention is directed to utilizing common photographic or imaging features, such as a common viewfinder, strobe and shutter button regardless of whether the apparatus is folded or not. The present invention is directed to using such common features so that whenever using them there is no requirement to physically adjusted or reoriented them. In addition, the camera is conveniently, ergonomically designed so that when used in the erect position used in the collapsed condition a user can effect image acquisition in a manner which is not ergonomically interfere with the user's manipulation of the camera. Although the present embodiment has disclosed that the imaging apparatus in the erect mode is a photographic system of the self-developing type it will be appreciated that such need not be the case. In addition, it is further contemplated that a printing system could be employed instead when the apparatus 20 is in the erect position.

Figure 10:
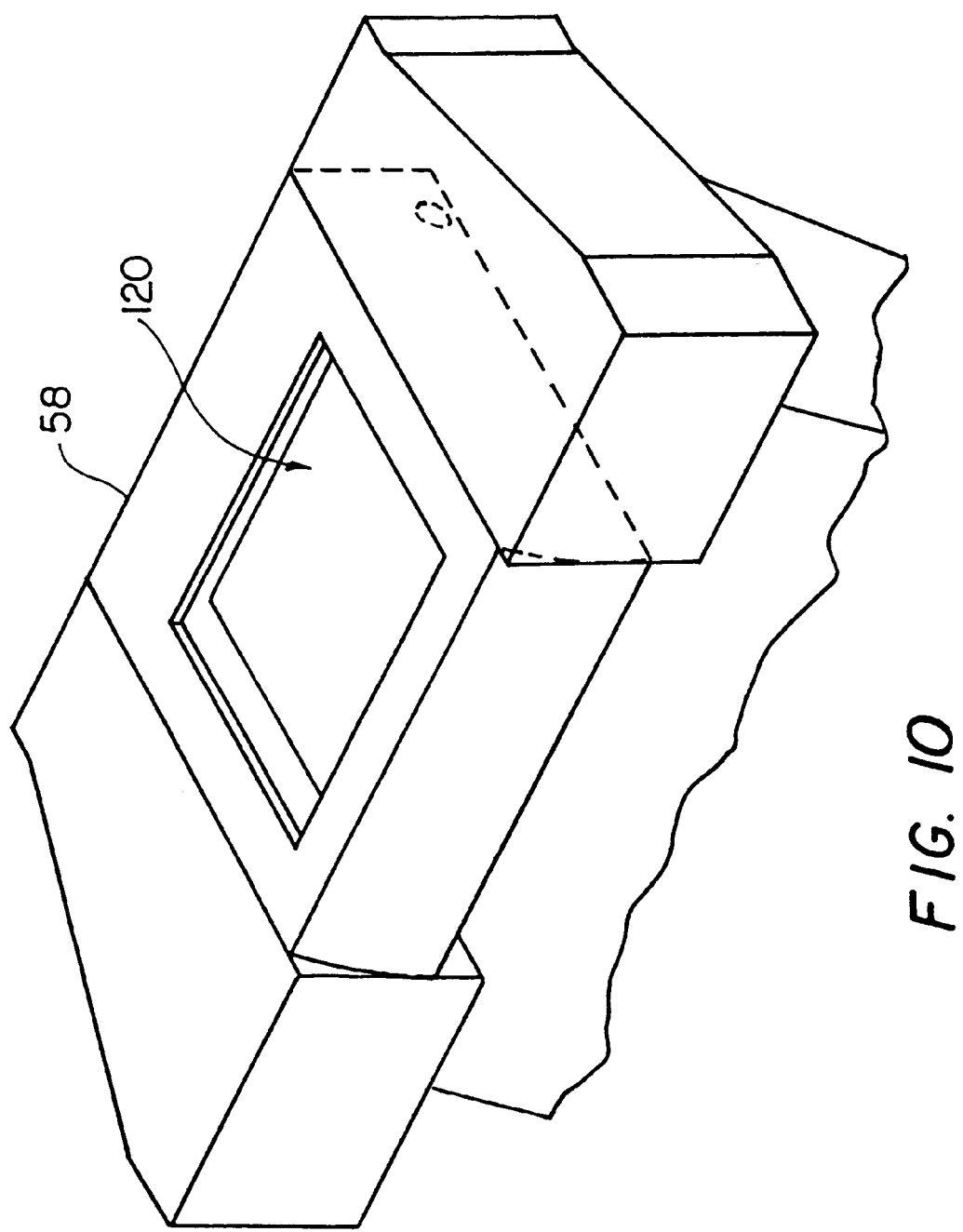
FIG. 10 is an enlarged perspective view illustrating an LCD housing assembly in a folded condition relative to an image acquisition apparatus; and, FIG. 11 is a view similar to FIG. 10 but showing the LCD housing assembly in a partially folded position.
Figure 11:
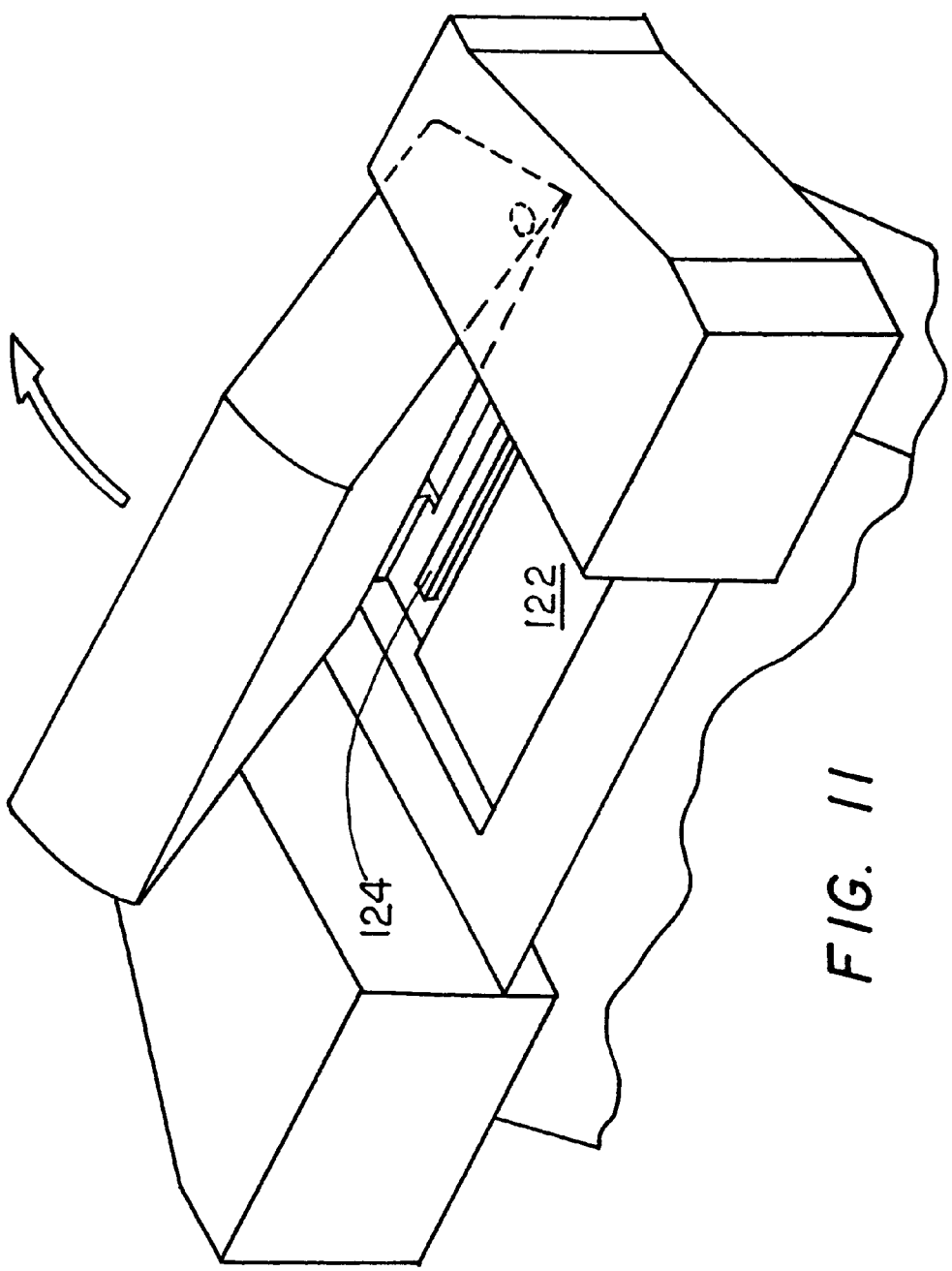

Reference is made to FIGS. 10 and 11 for illustrating an LCD housing assembly 58 that is pivotally mounted on the strobe and viewfinder housing and is operable for moving between unfolded and collapsed conditions. The LCD housing assembly 58 includes an LCD display 120 for use in displaying electronically captured images and electronic viewing and the suitable control buttons 56 are provided towards achieving this end. A variety of LCD displays can be used by the present invention. The invention is directed to expeditiously inserting, retaining and protecting the flash card by the LCD housing assembly. Towards this end, when the LCD housing assembly is in at least a partially erect position FIG. 12 a user is allowed to insert or remove an electronic flash memory card of the type used in digital imaging applications. The flash card is mounted in a complementary shaped cavity or recess 122 below the LCD housing assembly 58. Electric connectors 124 are provided which electrically interface between the camera and the card and functionally cooperate with the flash card, in a known manner, in order to connect the flash card to a control system (not shown) of the imaging apparatus. When the LCD housing assembly is moved to its folded condition, it serves to protect and retain the card when the imaging apparatus is being used. When the LCD housing assembly is moved from the folded position, the flash card can be inserted in the cavity. The control buttons 56 are manipulated for allowing the user to manipulate the LCD display in a variety of ways.

Although several specific and preferred embodiments of the present invention have been illustrated and described above, other variations of the present invention will become apparent to those skilled in the art. The scope of the invention is therefor not limited to the specific forms shown and described, but rather is indicated by the claims below.

What is claimed is:

1. A foldable multiple mode imaging acquisition apparatus; said apparatus comprising, in combination: a first housing assembly; a second housing assembly; an erecting assembly operatively interconnected to and between the first and second housing assemblies for allowing movement of the housing assemblies between a folded first condition and an unfolded second condition; and, a pair of spaced apart and generally longitudinally extending hand gripping sections on the first housing assembly; the hand gripping sections are sized and constructed to allow a user to easily and in a stable manner grip the apparatus in both the first and second conditions without having to remove hands from the first housing assembly and while the housing assemblies transition between the first and second conditions; further including a viewfinder assembly mounted adjacent a distal end portion of the second assembly and capable of viewing a scene; the viewfinder assembly is oriented in such a fashion that an operator can hold the apparatus in a generally vertical mode when the housing assemblies are in the first folded condition and view the scene, and in a generally horizontal mode when the housing assemblies are in the second unfolded condition and view the same scene.

2. The apparatus of claim 1 wherein each one of the hand gripping sections is located along a marginal edge portion of the first assembly and extends in a generally longitudinal direction relative thereto.

3. The apparatus of claim 1 wherein the first housing assembly houses photographic film of the self-developing type.

4. The apparatus of claim 1 wherein the second housing assembly comprises an electronic image acquisition apparatus thereon.

5. The apparatus of claim 1 further including a strobe assembly mounted adjacent a distal end portion of the second assembly so that the strobe can illuminate a scene to be imaged when the housing assemblies are in either of the first or second conditions.

6. The apparatus of claim 3 wherein an optical taking lens assembly is mounted on the second housing assembly for directing image forming light to a film plane in the first housing assembly for allowing exposure of the film plane.

7. The apparatus of claim 2 wherein the hand gripping sections contain operating components of the apparatus.

8. The apparatus of claim 4 wherein the image acquisition module comprises: housing means for defining a recess; a cover assembly connected to the housing assembly for folding movement between covering and uncovering positions with respect to the recess; an LCD assembly connected to the cover assembly in such a manner that it is within and faces the recess when the cover assembly is in the covering position; and means within the recess for detachably coupling a flash memory card which is constructed to be received therein.

9. An electronic camera, said camera comprising, in combination: a housing means for defining a recess; a cover assembly connected to the housing assembly for folding movement between covering and uncovering positions with respect to the recess; an LCD assembly connected to the cover assembly in such a manner that it is within and faces the recess when the cover assembly is in the covering position; and means within the recess for detachably coupling a flash memory card which is constructed to be received therein.

* * * * *